United States Patent [19]

Saita et al.

[11] Patent Number: 6,077,453
[45] Date of Patent: Jun. 20, 2000

[54] FERRITE, AND TRANSFORMER AND METHOD FOR DRIVING IT

[75] Inventors: Hitoshi Saita; Tomofumi Kuroda; Shigeo Okamoto; Naoyoshi Sato, all of Chiba, Japan

[73] Assignee: TDK Corporation, Tokyo, Japan

[21] Appl. No.: 09/231,763

[22] Filed: Jan. 15, 1999

[30] Foreign Application Priority Data

Jan. 23, 1998 [JP] Japan .................................. 10-026545

[51] Int. Cl.[7] .............................. C04D 35/26; H01F 1/34
[52] U.S. Cl. .................................. 252/62.59; 252/62.62; 336/233
[58] Field of Search ............................. 252/62.62, 62.59; 336/233

[56] References Cited

U.S. PATENT DOCUMENTS 5,846,448  12/1998  Yasuhara et al. ............ 252/62.62
5,980,773  11/1999  Takeda ......................... 252/62.62

FOREIGN PATENT DOCUMENTS 0 707 323  4/1996  European Pat. Off. .
7-297020  11/1995  Japan .

Primary Examiner—C. Melissa Koslow
Attorney, Agent, or Firm—Oblon, Spivak, McClelland, Maier & Neustadt, P.C.

[57] ABSTRACT

Provided are an Mn—Zn ferrite in which the core loss is low and Bs is high at high temperatures; a transformer capable of being small-sized and suitable to use at high temperatures; and a method for efficiently driving the transformer. Also provided is a transformer capable of being small-sized and suitable to use in a broad temperature range including high temperatures. Further provided are a high-efficiency transformer capable of being small-sized, in which the core loss in the ferrite core is low and the saturation magnetic flux density is high therein at the temperature at which the transformer is driven; and a high-efficiency driving method for the transformer. Depending on its use, Mn—Zn ferrite to be the ferrite core for the transformers comprises, as the essential components, specific amounts of $Fe_2O_3$, ZnO and MnO, and, as the side components, specific amounts of $SiO_2$, $CaCO_3$, $Nb_2O_5$ and $ZrO_2$. The core of the transformers is made of the Mn—Zn ferrite.

11 Claims, 1 Drawing Sheet

FERRITE, AND TRANSFORMER AND METHOD FOR DRIVING IT

FIELD OF THE INVENTION

The present invention relates to an Mn—Zn ferrite suitable for transformer cores, in which the core loss is low and the saturation magnetic flux density is high at high temperatures, to a transformer with an Mn—Zn ferrite core which is used in power supplies for switching converters and display monitors, and also to a method for driving the transformer.

The invention further relates to a transformer with an Mn—Zn ferrite core in which the core loss is low and the saturation magnetic flux density is high at its driving temperature falling between 50 and 70° C. or so, and to a method for driving the transformer.

BACKGROUND OF THE INVENTION

Mn—Zn ferrites are much used as materials for transformers for various communication appliances, household and industrial appliances, etc. The temperature at which transformers in conventional switching power supplies are used falls between 60 and 100° C., and the switching frequency for the power supplies falls between 10 and 100 kHz. The minimum core loss in transformers is within the practical temperature range, and various studies of additive addition, element substitution, firing condition change and others have heretofore been made so as to lower the core loss in transformers within the practical temperature range (see Japanese Patent Application Laid-Open (JP-A) Hei-8-169756, etc.). With the recent tendency toward small-sized and lightweight switching power supplies, high frequency has become used for switching frequency. Low core loss materials for a frequency falling between 500 kHz and 1 MHz or so have been developed (see JP-A Hei-8-148323, etc.).

However, since transformers generate heat by themselves and are used in high-temperature conditions, the temperature of the transformer core being actually driven is often high to fall between 80 and 110° C.

Ferrites for power supplies of that type have been proposed in JP-A Hei-3-141612 and Hei-7-297020. The Mn—Zn ferrites proposed therein have an essential component of ZnO of being not smaller than 10 mol %, and contains an additive of $Nb_2O_5$ in the former (Hei-3-141612) or $Nb_2O_5$ combined with $ZrO_2$ in the latter (Hei-7-297020) and additionally $SnO_2$ and $TiO_2$ in an amount of not smaller than 300 ppm, to thereby lower the core loss in those ferrites.

However, it is still desired that magnetic oxide materials shall satisfy not only low core loss but also high saturation magnetic flux density therein so as to realize small-sized and efficient transformers within the practical temperature range noted above.

Mn—Zn ferrites having a ZnO content of not smaller than 10 mol % could realize reduced core loss therein, but could not realize increased saturation magnetic flux density within the practical temperature range noted above, especially at a temperature falling between 100 and 110° C.

In this connection, the core loss reduction in Mn—Zn ferrites could be realized by element substitution of adding $SnO_2$ and $TiO_2$ to the ferrites. However, no magnetic oxide materials are known capable of realizing increased saturation magnetic flux density within the practical temperature range noted above.

On the other hand, where the practical temperature range for magnetic oxide materials is broad, for example, it falls between 20 and 120° C., the materials are indispensably required to satisfy low core loss therein. However, if the saturation magnetic flux density in the materials varies, depending on the temperature at which the power supplies comprising the materials are used, and, as a result, if the permeability of the materials is thereby varied, the inductance of the materials shall vary, depending on the ambient temperature even though the magnetic field around the materials does not vary. For these reasons, therefore, when the materials are used for power smoothing, the ripple in the outputted power will vary, thereby causing the problem that the power-outputting characteristics of the power supplies comprising the materials vary.

Mn—Zn ferrites having a ZnO content of not smaller than 10 mol % could realize reduced core loss therein, but the temperature-dependent variation in the saturation magnetic flux density in them is large within the practical temperature range noted above.

For the reasons mentioned above, it is desired to develop ferrites and transformers suitable to use at high temperatures and also in a broad temperature range including high temperatures.

On the other hand, desired are transformers in which the core loss is low at their driving temperatures under the conditions under which they may generate a small quantity of heat by themselves. For such transformers in that situation, it is still desired to lower the high-frequency core loss in them so as to meet the requirement of small-sized and lightweight switching power supplies. The driving temperature for transformers generally falls between 50 and 70° C. However, with advance knowledge of the generation of heat in transformers, ferrites for transformers may be so designed that the core loss in the transformers comprising them could be the lowest within a temperature range falling between 80 and 100 C. (see JP-A Hei-3-141612, Hei-7-297020, Hei-8-169756, etc.). Of those patent publications, JP-A Hei-8-169756 discloses a low core loss Mn—Zn ferrite core which consists essentially of from 25 to 40 mol % of MnO and from 6 to 25 mol % of ZnO with the balance of $Fe_2O_3$ and contains, as side components, from 0.002 to 0.040 wt. % of $SiO_2$ and from 0.02 to 0.20 wt. % of CaO and in which the side component elements are segregated to be in the grain boundaries in such a manner that the half width of their concentration distribution is not larger than 10 nm. They say in JP-A Hei-8-169756 that the side components may further include $Nb_2O_5$, $Ta_2O_5$, $ZrO_2$ and $V_2O_5$. The composition of the samples actually demonstrated in their Examples was so designed that the core loss in them could be the lowest at 90° C. Briefly, the composition of the essential components in those samples is composed of 53.5 mol % of $Fe_2O_3$, 34.5 mol % of MnO and 12.0 mol % of ZnO.

As in JP-A Hei-8-169756, the ferrite is so designed that the core loss therein could be the lowest at temperatures higher then its driving temperature. However, under the conditions under which transformers may generate a small quantity of heat by themselves, it is necessary that the core loss in the transformers is lower within a temperature range of from 50 to 70° C. within which the transformers are driven.

To meet the requirement, JP-A Hei-8-191011 discloses an Mn—Zn—Co ferrite in which the core loss is reduced within the driving temperature noted above. The additive oxides that may be in the ferrite include $SiO_2$, CaO, $ZrO_2$ and $Ta_2O_5$.

However, the Mn—Zn—Co ferrite in JP-A Hei-8-191011 is still problematic in that the core loss therein within the driving temperature range that falls between 50 and 70° C. could not be reduced to a satisfactory level, and therefore requires further studies on it.

SUMMARY OF THE INVENTION

The first object of the present invention is to provide a ferrite in which the core loss is low and the saturation magnetic flux density is high at high temperatures. The second object is to provide a transformer capable of being small-sized and suitable to use at high temperatures. The third object is to provide a transformer capable of being small-sized and suitable to use in a broad temperature range including high temperatures. The fourth object is to provide a method for efficiently driving the small-sized transformer at high temperatures. The fifth object is to provide a high-efficiency transformer capable of being small-sized, of which the core is made of a ferrite of such that the core loss therein is low and the saturation magnetic flux density therein is high within the driving temperature range (between 50 and 70° C.) for the transformer. The sixth object is to provide a method for efficiently driving the transformer.

The objects mentioned above are attained by the invention which provides the following:

(1) A ferrite consisting essentially of iron oxide in an amount of from 53 to 55 mol % calculated as $Fe_2O_3$, zinc oxide in an amount of from 6.5 to 9.5 mol % calculated as ZnO, and manganese oxide, and containing, as side components, silicon oxide in an amount of from 80 to 150 ppm calculated as $SiO_2$, calcium oxide in an amount of from 600 to 1000 ppm calculated as $CaCO_3$, niobium oxide in an amount of from 150 to 400 ppm calculated as $Nb_2O_5$, and zirconium oxide in an amount of from 40 to 300 ppm calculated as $ZrO_2$.

(2) A transformer of which the core is made of a ferrite that consists essentially of iron oxide in an amount of from 53 to 55 mol % calculated as $Fe_2O_3$, zinc oxide in an amount of from 4.0 to 9.5 mol % calculated as ZnO, and manganese oxide, and contains, as side components, silicon oxide in an amount of from 60 to 200 ppm calculated as $SiO_2$, calcium oxide in an amount of from 300 to 1200 ppm calculated as $CaCO_3$, niobium oxide in an amount of from 50 to 500 ppm calculated as $Nb_2O_5$, and zirconium oxide in an amount of from 10 to 450 ppm calculated as $ZrO_2$, and in which the saturation magnetic flux density (direct current) in the ferrite at a temperature falling between 100 and 120° C. is not smaller than 410 mT.

(3) The transformer of (2), wherein the minimum core loss in the ferrite is within a temperature range falling between 100 and 110° C. and the minimum core loss (at a frequency of 100 kHz) is not larger than 300 kW/m³.

(4) The transformer of (2) or (3), wherein the ferrite consists essentially of iron oxide in an amount of from 53 to 55 mol % calculated as $Fe_2O_3$, zinc oxide in an amount of from 6.5 to 9.5 mol % calculated as ZnO, and manganese oxide, and contains, as side components, silicon oxide in an amount of from 80 to 150 ppm calculated as $SiO_2$, calcium oxide in an amount of from 600 to 1000 ppm calculated as $CaCO_3$, niobium oxide in an amount of from 150 to 400 ppm calculated as $Nb_2O_5$, and zirconium oxide in an amount of from 40 to 300 ppm calculated as $ZrO_2$.

(5) A transformer of which the core is made of a ferrite that consists essentially of iron oxide in an amount of from 53 to 55 mol % calculated as $Fe_2O_3$, zinc oxide in an amount of from 2.0 to 8.0 mol % calculated as ZnO, and manganese oxide, and contains, as side components, silicon oxide in an amount of from 60 to 200 ppm calculated as $SiO_2$, calcium oxide in an amount of from 300 to 1200 ppm calculated as $CaCO_3$, niobium oxide in an amount of from 50 to 500 ppm calculated as $Nb_2O_5$, and zirconium oxide in an amount of from 10 to 450 ppm calculated as $ZrO_2$, and in which the absolute value of the temperature-dependent coefficient of the saturation magnetic flux density (direct current) in the ferrite at a temperature falling between 20 and 120° C. is not larger than 1.6 mT/° C.

(6) A method for driving a transformer of which the core is made of a ferrite that consists essentially of iron oxide in an amount of from 53 to 55 mol % calculated as $Fe_2O_3$, zinc oxide in an amount of from 4.0 to 9.5 mol % calculated as ZnO, and manganese oxide, and contains, as side components, silicon oxide in an amount of from 60 to 200 ppm calculated as $SiO_2$, calcium oxide in an amount of from 300 to 1200 ppm calculated as $CaCO_3$, niobium oxide in an amount of from 50 to 500 ppm calculated as $Nb_2O_5$, and zirconium oxide in an amount of from 10 to 450 ppm calculated as $ZrO_2$, wherein the transformer is driven at a temperature falling between 60 and 120° C., at a frequency falling between 20 and 500 kHz and in an exciting magnetic flux density falling between 200 and 500 mT.

(7) The method for driving a transformer of (6), wherein the ferrite for the core of the transformer consists essentially of iron oxide in an amount of from 53 to 55 mol % calculated as $Fe_2O_3$, zinc oxide in an amount of from 6.5 to 9.5 mol % calculated as ZnO, and manganese oxide, and contains, as side components, silicon oxide in an amount of from 80 to 150 ppm calculated as $SiO_2$, calcium oxide in an amount of from 600 to 1000 ppm calculated as $CaCO_3$, niobium oxide in an amount of from 150 to 400 ppm calculated as $Nb_2O_5$, and zirconium oxide in an amount of from 40 to 300 ppm calculated as $ZrO_2$.

(8) A transformer of which the core is made of a ferrite that consists essentially of iron oxide in an amount of from 54 to 56 mol % calculated as $Fe_2O_3$, zinc oxide in an amount of from 6 to 11 mol % calculated as ZnO, and manganese oxide, and contains, as side components, silicon oxide in an amount of from 80 to 150 ppm calculated as $SiO_2$, calcium oxide in an amount of from 600 to 1000 ppm calculated as $CaCO_3$, niobium oxide in an amount of from 150 to 400 ppm calculated as $Nb_2O_5$, and zirconium oxide in an amount of from 40 to 300 ppm calculated as $ZrO_2$, and in which the saturation magnetic flux density (direct current) in the ferrite at 60° C. is not smaller than 480 mT, the minimum core loss in the ferrite is within a temperature range falling between 50 and 70° C. and the minimum core loss (at a frequency of 100 kHz) is not larger than 260 kW/m³.

(9) The transformer of (8), wherein the zinc oxide content of the ferrite falls between 6 and 9.5 mol % calculated as ZnO.

(10) The transformer of (8) or (9), wherein the saturation magnetic flux density (direct current) in the ferrite at 60° C. is not smaller than 500 mT.

(11) A method for driving a transformer of any one of (8) to (10) at a temperature falling between 50 and 70° C., at a frequency falling between 20 and 500 kHz and in an exciting magnetic flux density falling between 125 and 500 mT.

In JP-A Hei-8-169756, proposed is an Mn—Zn ferrite having a ZnO content of from 6 to 25 mol %, in which the core loss is low at temperatures around 90° C. In this, however, the samples concretely demonstrated in Examples have a ZnO content of 12.0 mol % and an $Fe_2O_3$ content of 53.5 mol %. Therefore, the invention of JP-A Hei-8-169756 shall be obviously differentiated from the present invention.

In JP-A Hei-8-148323, shown are magnetic materials having a reduced degree of core loss within a range of medium frequency to high frequency bands. In this, the comparative samples referred to in Examples have a ZnO content of 8.0 mol %. However, nothing that relates to addition of $Nb_2O_5$ to ferrites is referred to in JP-A Hei-8-148323. Therefore, the technical idea for the invention of JP-A Hei-8-148323 is basically different from that for the present invention.

In JP-A Hei-8-191011, shown are Mn—Zn—Co ferrites for transformers in which the core loss at the driving temperature for the transformers is reduced. However, nothing that relates to addition of $Nb_2O_5$ to the ferrites is referred to in JP-A Hei-8-191011. Therefore, the technical idea for the invention of JP-A Hei-8-191011 is also basically different from that for the present invention.

DETAILED DESCRIPTION OF THE INVENTION

Figure 1:
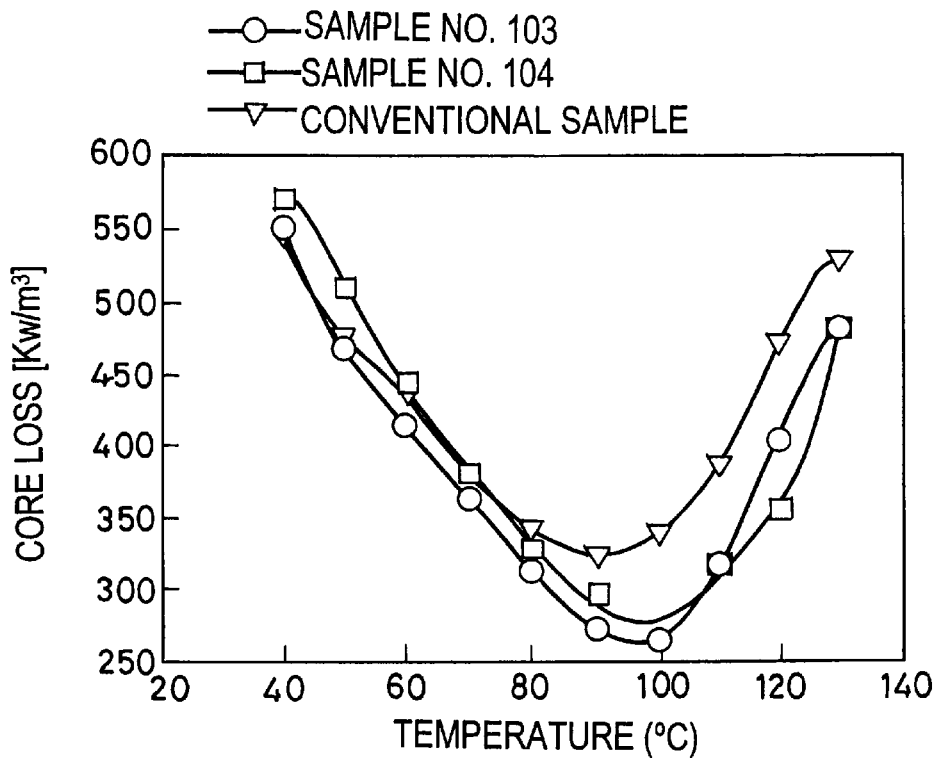
FIG. 1 is a graph showing the temperature-dependent variation in the core loss in ferrite samples.

The present invention is described in detail hereinunder.

The ferrite core material for one embodiment of the transformers of the invention comprises a ferrite having the composition mentioned below, in which the saturation magnetic flux density Bs (direct current) at a temperature falling between 100 and 120° C. is not smaller than 410 mT.
Essential Components:

Iron oxide in an amount of from 53 to 55 mol % (calculated as $Fe_2O_3$),

Zinc oxide in an amount of from 4.0 to 9.5 mol %, preferably from 6.5 to 9.5 mol % (calculated as ZnO), and Manganese oxide as the balance (calculated as MnO).
Side Components:

Silicon oxide in an amount of from 60 to 200 ppm, preferably from 80 to 150 ppm (calculated as $SiO_2$), Calcium oxide in an amount of from 300 to 1200 ppm, preferably from 600 to 1000 ppm (calculated as $CaCO_3$), Niobium oxide in an amount of from 50 to 500 ppm, preferably from 150 to 400 ppm (calculated as $Nb_2O_5$), and Zirconium oxide in an amount of from 10 to 450 ppm, preferably from 40 to 300 ppm (calculated as $ZrO_2$).

The ferrite composition is characterized by high Bs at high temperatures noted above and by reduced core loss in a high temperature range (falling between 100 and 110° C.).

Therefore, transformers of which the core is made of the ferrite of that type noted above can be efficiently driven even when the temperature of the ferrite core reaches 80 to 110° C. due to the heat generated by the transformer themselves or in high-temperature conditions, and therefore, the transformers are suitable to use at high temperatures. More concretely, since the ferrite material realizes high Bs at high temperatures, the ferrite cores in the transformers can be small-sized, and therefore the transformers themselves can be small-sized. In addition, since the core loss in the transformers is small at high temperatures, the power to be consumed by the transformers at high temperatures and also the heat to be generated by them can be reduced.

Bs (direct current) in the ferrite having the composition mentioned above is not smaller than 410 mT at a temperature falling between 100 and 120° C. As in FIG. 2, Bs linearly varies relative to the ambient temperature change, and its temperature-dependent coefficient is negative. Therefore, Bs in the ferrite must be at least 410 mT at 120° C. Preferably, Bs in the ferrite within the temperature range noted above is at least 415 mT, more preferably at least 420 mT. Though not specifically defined, the uppermost limit of Bs may be 500 mT or so. The temperature-dependent coefficient of Bs is represented by the following equation in which Bs [100° C.] indicates the value of Bs at 100° C. and Bs [120° C.] indicates the value of Bs at 120° C. The coefficient generally falls between −1.6 and 0 mT/° C. or so.

Temperature-Dependent Coefficient=(Bs[120° C.]−Bs[100° C.])/(120° C.−100° C.)

Where the core loss in the ferrite is measured at a frequency falling between 20 and 500 kHz (preferably between 75 and 150 kHz) and in an exciting magnetic flux density falling between 200 and 500 mT (preferably between 200 and 350 mT), its minimum value is within a temperature range falling between 100 and 110° C., and the core loss thus measured (at 100 kHz and in 200 mT) is at most 300 kW/m$^3$, preferably at most 270 kW/m$^3$. Though not specifically defined, the lowermost limit of the core loss may be 200 kW/m$^3$ or so.

As opposed to the ferrite composition noted above, the core loss in the others of which the composition of the essential components falls outside the ranges noted above is high and Bs therein often lowers depending on the composition of the essential components. Many conventional Mn—Zn ferrite materials for transformers have a ZnO content of not smaller than 10 mol % for the purpose of reducing the core loss in them. As opposed to those, the present invention is characterized by the lowered amount of ZnO in the ferrite, by which Bs in the ferrite is increased. Therefore, in the invention, if the ZnO content of the ferrite is larger than 9.5 mol %, Bs in the ferrite shall lower. On the other hand, however, if the ZnO content of the ferrite is smaller than 4.0 mol %, the core loss in the ferrite will increase. If the $Fe_2O_3$ content of the ferrite is smaller than 53 mol %, the temperature at which the core loss in the ferrite could be the lowest will be higher than 110° C., thereby resulting in that the core loss in the ferrite within the intended temperature range increases. Depending on the ratio of Fe/Mn in the ferrite having an $Fe_2O_3$ content of from 54 to 55 mol %, the core loss in the ferrite could be the lowest at any temperature falling between 50 and 110° C. Therefore, in accordance with the intended temperature range for transformers, it is possible to select any desired composition of the ferrite in which the core loss could be lower within the temperature range. However, if the $Fe_2O_3$ content of the ferrite is larger than 55 mol %, the core loss in the ferrite could not be the lowest within a temperature range between 100 and 110° C. and the minimum core loss in the ferrite will appear at lower temperatures than that range. If so, therefore, the core loss in the ferrite will increase within the intended temperature range.

The compositional range of the side components in the ferrite of the invention is defined essentially for the purpose of realizing the reduction in the core loss in the ferrite. If the amounts of the side components constituting the ferrite are outside the defined ranges, the core loss in the ferrite will increase. $SiO_2$ and CaO form an intergranular phase in the ferrite, while contributing to the increase in the resistance of the ferrite. Accordingly, if their amounts added to the ferrite are too small, their contribution to the resistance increase will be small; but if too large, they will cause abnormal grain growth in the ferrite whereby the core loss in the ferrite will increase. For these reasons, therefore, the amounts of $SiO_2$ and $CaCO_3$ to be added are defined to fall within the ranges noted above. $Nb_2O_5$ and $ZrO_2$ added to the ferrite along with $SiO_2$ and $CaCO_3$ act to prevent abnormal grain growth in the ferrite, while contributing to forming a thin and uniform high-resistance phase in the grain boundaries in the ferrite. In that manner, $Nb_2O_5$ and $ZrO_2$ act to further lower the core loss in the ferrite. However, if their amounts are larger than the defined ranges, the side components will cause abnormal grain growth in the ferrite, thereby increasing the core loss therein. If, on the contrary, their amounts are smaller than the defined ranges, the side components will be ineffective and could not contribute to the reduction in the core loss in the ferrite.

The mean grain size of the ferrite may generally fall between 10 and 30 μm or so.

In order to realize the reduction in the core loss in the ferrite, if desired, additional side components of tin oxide (its amount is calculated as $SnO_2$) and/or titanium oxide (its amount is calculated as $TiO_2$) may be added to the ferrite in an amount of not larger than 5000 ppm. However, the tetra-valent non-magnetic cations Sn and Ti may form solutes in the grains constituting the ferrite, thereby reducing Bs in the ferrite by a few %.

The effect of the present invention characterized in that the core loss in the ferrite is low and Bs therein is high within the predetermined temperature range noted above is further augmented when the amounts of the components constituting the ferrite fall within the preferred ranges noted above.

The transformer of the invention has a core which is made of the ferrite having the composition and the characteristics mentioned above, and is therefore well driven at a temperature falling between 60 and 120° C. (preferably between 100 and 110° C.), at a frequency falling between 20 and 500 kHz (preferably between 75 and 150 kHz) and in an exciting magnetic flux density falling between 200 and 500 mT (preferably between 200 and 350 mT).

On the other hand, the ferrite having the composition mentioned below is characterized in that the absolute value of the temperature-dependent coefficient of Bs in the ferrite at a temperature falling between 20 and 120° C. is not larger than 1.6 mT/° C. Therefore, the transformer of which the core is made of the ferrite can be driven in a broad temperature range falling between 20 and 120° C.

Essential Components:
Iron oxide in an amount of from 53 to 55 mol % (calculated as $Fe_2O_3$),
Zinc oxide in an amount of from 2.0 to 8.0 mol %, preferably from 6.5 to 8.0 mol % (calculated as ZnO), and
Manganese oxide as the balance (calculated as MnO).

Side Components:
Silicon oxide in an amount of from 60 to 200 ppm, preferably from 80 to 150 ppm (calculated as $SiO_2$),
Calcium oxide in an amount of from 300 to 1200 ppm, preferably from 600 to 1000 ppm (calculated as $CaCO_3$),
Niobium oxide in an amount of from 50 to 500 ppm, preferably from 150 to 400 ppm (calculated as $Nb_2O_5$), and
Zirconium oxide in an amount of from 10 to 450 ppm, preferably from 40 to 300 ppm (calculated as $ZrO_2$).

The ferrite composition is characterized in that Bs therein is high within a temperature range falling between 20 and 120° C. while linearly varying within the temperature range (see FIG. 2), that the temperature-dependent coefficient of Bs falls between −1.6 and 0 mT/° C., that the minimum core loss therein is within a high temperature range (falling between 90 and 120° C.), and that the core loss therein is low at high temperatures. The temperature-dependent coefficient of Bs is represented by the following equation in which Bs [20° C.] indicates the value of Bs at 20° C. and Bs [120° C.] indicates the value of Bs at 120° C.

Temperature-Dependent Coefficient, dBs/dT (T=20 to 120° C.)= (Bs[120° C.]−Bs[20° C.])/(120° C.−20° C.)

Bs at a temperature falling between 20 and 120° C. is at least 410 mT, preferably at least 415 mT, more preferably at least 420 mT. Though not specifically defined, the uppermost limit of Bs may be 500 mT or so.

If the ZnO content of the ferrite is larger than 8.0 mol %, the absolute value of the temperature-dependent coefficient of Bs in the ferrite will be larger than 1.6. On the other hand, however, if the ZnO content of the ferrite is smaller than 2.0 mol %, the core loss in the ferrite will be too high.

The ferrite core material for another embodiment of the transformers of the invention comprises a ferrite having the composition mentioned below, in which the saturation magnetic flux density Bs (direct current) at 60° C. is not smaller than 480 mT, the core loss is the lowest within a temperature range falling between 50 and 70° C. and the minimum core loss (at a frequency of 100 kHz) is not larger than 260 $kW/m^3$.

Essential Components:
Iron oxide in an amount of from 54 to 56 mol %, preferably from 54.5 to 55 mol % (calculated as $Fe_2O_3$),
Zinc oxide in an amount of from 6 to 11 mol %, preferably from 6 to 9.5 mol %, even more preferably from 7.0 to 9.0 mol % (calculated as ZnO), and
Manganese oxide as the balance (calculated as MnO).

Side Components:
Silicon oxide in an amount of from 80 to 150 ppm (calculated as $SiO_2$),
Calcium oxide in an amount of from 600 to 1000 ppm (calculated as $CaCO_3$),
Niobium oxide in an amount of from 150 to 400 ppm (calculated as $Nb_2O_5$), and
Zirconium oxide in an amount of from 40 to 300 ppm (calculated as $ZrO_2$).

The ferrite composition is characterized by high Bs at temperatures falling within the driving temperature range for transformers of from 50 to 70° C. or so and by reduced core loss in the temperature range, as so mentioned hereinabove.

Therefore, using the core material of the ferrite of that type in producing transformer cores realizes high-efficiency transformers. More concretely, the ferrite cores in the transformers can be small-sized, and therefore the transformers themselves can be small-sized. In addition, since the core loss in the transformers is low, the power to be consumed by the transformers and also the heat to be generated by them can be reduced.

Bs (direct current) at 60° C. in the ferrite having the composition mentioned above is not smaller than 480 mT, but preferably not smaller than 500 mT, more preferably not smaller than 505 mT. Though not specifically defined, the uppermost limit of Bs may be 600 mT or so.

The temperature range within which the core loss in the ferrite is the lowest, and also the minimum core loss in that temperature range are measured at a frequency falling between 20 and 500 kHz (preferably between 75 and 150 kHz) and in an exciting magnetic flux density falling between 125 and 500 mT (preferably between 200 and 350 mT). The core loss in the ferrite is the lowest within a temperature range falling between 50 and 70° C., and the minimum core loss (at 100 kHz and in 200 mT) is at most 260 $kW/m^3$, preferably at most 250 $kW/m^3$. Though not specifically defined, the lowermost limit of the core loss may be 100 $kW/m^3$ or so.

As opposed to the ferrite composition noted above, Bs in the others of which the composition of the essential components falls outside the ranges noted above could not be high, and the core loss in those will be high. The reason why the $Fe_2O_3$ content of the ferrite is defined to fall within the range noted above is as follows. In order that transformers could be most efficiently driven in power supplies and the like within the driving temperature range for the transformers, the core loss in the transformers shall be lowered within the driving temperature range, as so mentioned hereinabove. For this purpose, since the core loss in transformers varies depending on the temperature change therein, it is necessary that the core loss is the lowest within the temperature range within which the transformers are driven or around that temperature range (that is, the driving temperature range for transformers), and that the core loss is low within the driving temperature range. For this, it is well known to control the $Fe_2O_3$ content of the ferrite for transformer cores. If the $Fe_2O_3$ content is larger than 56 mol %, the core loss in the ferrite cores will be the lowest at temperatures lower than 50° C. for the intended temperature range, or that is, the core loss therein will be high within the intended temperature range. Depending on the ratio of Fe/Mn in the ferrite having an $Fe_2O_3$ content of from 54 to 55 mol %, the core loss in the ferrite could be the lowest at any temperature falling between 50 and 110° C. Therefore, in accordance with the intended temperature range for transformers, it is possible to select any desired composition of the ferrite in which the core loss could be lower within the temperature range. However, if the $Fe_2O_3$ content of the ferrite is larger than 55 mol %, the minimum core loss in the ferrite may appear at lower temperatures, but when it is not larger than 56 mol %, the core loss in the ferrite will be reduced within the intended temperature range. On the other hand, however, if the $Fe_2O_3$ content is smaller than 54 mol %, the minimum core loss in the ferrite will appear at higher temperatures, thereby resulting in that the core loss will be high in the intended temperature range. The reason why the ZnO content of the ferrite is defined to fall within the above-mentioned range is because, if it is larger than 11 mol %, Bs in the ferrite will lower, and if smaller than 6 mol %, the core loss therein will increase.

The compositional range of the side components in the ferrite is defined essentially for the purpose of realizing the reduction in the core loss in the ferrite. If the amounts of the side components constituting the ferrite are outside the defined ranges, the core loss in the ferrite will increase. $SiO_2$ and CaO form an intergranular phase in the ferrite, while contributing to the increase in the resistance of the ferrite. Accordingly, if their amounts added to the ferrite are too small, their contribution to the resistance increase will be small; but if too large, they will cause abnormal grain growth in the ferrite whereby the core loss in the ferrite will increase. For these reasons, therefore, the amount of $SiO_2$ to be in the ferrite is defined to fall between 80 and 150 ppm, and that of and $CaCO_3$ is defined to fall between 600 and 1000 ppm. $Nb_2O_5$ and $ZrO_2$ added to the ferrite along with $SiO_2$ and $CaCO_3$ act to prevent abnormal grain growth in the ferrite, while contributing to forming a thin and uniform high-resistance phase in the grain boundaries in the ferrite. In that manner, $Nb_2O_5$ and $ZrO_2$ act to further lower the core loss in the ferrite. However, if their amounts are larger than the defined ranges, the side components will cause abnormal grain growth in the ferrite, thereby increasing the core loss therein. If, on the contrary, their amounts are smaller than the defined ranges, the side components will be ineffective and could not contribute to the reduction in the core loss in the ferrite.

Using $Ta_2O_5$ in place of $Nb_2O_5$ will increase the core loss in the ferrite.

The mean grain size of the ferrite may generally fall between 10 and 30 $\mu$m or so.

In order to realize the reduction in the core loss in the ferrite, if desired, additional side components of tin oxide (its amount is calculated as $SnO_2$) and/or titanium oxide (its amount is calculated as $TiO_2$) may be added to the ferrite in an amount of not larger than 5000 ppm. However, the tetra-valent nonmagnetic cations Sn and Ti may form solutes in the grains constituting the ferrite, thereby reducing Bs in the ferrite by a few %.

Cobalt oxide may also be added to the ferrite. In practical use, the cobalt oxide content of the ferrite could fall between 0 and 3000 ppm or so, calculated as $Co_3O_4$.

The effect of the present invention characterized in that the core loss in the ferrite is low and Bs therein Is high within the predetermined temperature range noted above is further augmented when the amounts of the components constituting the ferrite fall within the preferred ranges noted above.

The transformer of the invention has a core which is made of the ferrite having the composition and the characteristics mentioned above, and is therefore well driven at a temperature falling between 50 and 70° C., at a frequency falling between 20 and 500 kHz (preferably between 75 and 150 kHz) and in an exciting magnetic flux density falling between 125 and 500 mT (preferably between 200 and 350 mT).

To produce one embodiment of the ferrite cores for transformers of the invention, first prepared is a mixture of predetermined amounts of an iron oxide component, a manganese oxide component and a zinc oxide component. For the other embodiment of the ferrite cores for transformers of the invention, oxide cobalt may be added to the mixture in this stage.

Compounds for the side components mentioned above are added to the mixture of the essential components. Their amounts shall be so controlled that the final mixture may have the predetermined compositional ratio. After the essential components and the side components have been mixed in that manner, a small amount of a suitable binder, for example, polyvinyl alcohol (PVA) is added thereto, and the resulting mixture is granulated, using a spray drier or the like, into grains having a grain size falling between 80 and 200 $\mu$m or so. Next, the grains are molded, and the resulting moldings are fired in an atmosphere having a controlled oxygen concentration, at a predetermined temperature falling between 1250 and 1400° C.

The transformer of the invention may be produced by coiling a predetermined wire around the ferrite core having been molded in the manner mentioned above to have a predetermined shape. The shape and the size of the core may be varied, depending on the object and the use of the transformer to be produced. For example, the core may have any shape of toroidal forms, E-shaped forms, RM-shaped forms, ET-shaped forms, UU-shaped forms, FT-shaped forms, PQ-shaped forms, etc. The transformers of the invention can be small-sized. For example, for those suitable to use at high temperatures, the size of the core may be from 5 to 40% smaller than that of conventional cores.

The coiling count for the core may be varied, depending on the object and the use of the transformer to be produced.

The transformer of the present invention can be used in switching power supplies for much small-sized and power-saving electronic appliances. In addition, the transformer is also usable in power supplies to be mounted on electric cars and hybrid cars.

The invention is described in more detail herein under with reference to the following Examples, which, however, are not intended to restrict the scope of the invention.

EXAMPLES

Example 1

Essential components of $Fe_2O_3$, MnO and ZnO were weighed each in a predetermined amount as in Tables 1 and 2, wet-blended, and then calcined in air at 850° C. for 2 hours. Depending on the amounts of the essential components, predetermined amounts of side components of $SiO_2$, $CaCO_3$, $Nb_2O_5$ and $ZrO_2$ were added to the resulting mixture, and wet-milled to obtain a ferrite powder. 0.8% by weight, calculated as its solid content, of a binder of PVA was added to the powder, and granulated. The resulting grains were molded under a pressure of 1 ton/cm² into toroidal moldings (outer diameter: 24 mm, inner diameter: 12 mm, thickness: 5.5 mm). The moldings were fired in a mixed gas atmosphere of $N_2$—$O_2$ having a controlled oxygen partial pressure, at a firing temperature of 1300° C. for 5 hours. Thus were obtained toroidal cores having an outer diameter of 20 mm, an inner diameter of 10 mm and a thickness of 5 mm. Through its fluorescent X-ray spectrometry, the final ferrite composition was verified to correspond to the composition of the starting components.

Each sample obtained herein was tested in an alternating current B-H analyzer (IWATSU-SY8232) for the core loss therein at an exciting magnetic flux density of 200 mT and at a frequency of 100 kHz. In addition, it was tested in a direct current B-H analyzer (YEW4192) for the saturation magnetic flux density Bs therein in a magnetic field of 15 Oe and at a temperature of 120° C.

Tables 1 and 2 show the data of Bs and the minimum core loss in each sample, and the temperature at which the core loss was minimized. FIG. 1 shows the temperature-dependent variation in the core loss in Samples Nos. 103 and 104 (samples of the invention), and Sample No. 106 (conventional sample).

Specifically, it is known that the core loss in the ferrite cores for transformers of the present invention is low and the saturation magnetic flux density therein is high, as compared with those in the conventional ferrite core for transformers of Sample No. 106. As realizing such high saturation magnetic flux density, the ferrite cores for transformers of the invention can be small-sized and even the transformers themselves of the invention can also be small-sized.

Using the ferrite core of Sample No. 103 of the invention, produced was a transformer.

Briefly, the ferrite core was PQ-shaped, and its size was 59 mm×42 mm×27 mm (metatarsal diameter: 24 mm). For the coiling count for the core, the primary coil was in one turn, and the secondary coil was in 4 turns.

The transformer was found to be well driven at a temperature of 110° C., at a frequency of 100 kHz and in an exciting magnetic flux density of 200 mT.

In addition, it was found that ferrite core of the invention is more small-sized than the conventional ferrite core of Sample No. 106 (by about 10% calculated as the cross section of the core). Moreover, it was further found that the power to be consumed by the transformer of the invention was reduced and that the heat as generated by the transformer being driven was lowered.

TABLE 1

| Sample No. | Essential Components (mol %) | | | Side Components (ppm) | | | | Bs (120° C.) (mT) | Minimum Core Loss (kW/m³) | Temperature for Minimum Core Loss (° C.) |
|---|---|---|---|---|---|---|---|---|---|---|
| | $Fe_2O_3$ | ZnO | MnO | $SiO_2$ | $CaCO_3$ | $Nb_2O_5$ | $ZrO_2$ | | | |
| 101 | 53.8 | 9.0 | 37.2 | 100 | 800 | 300 | 250 | 415 | 258 | 100–110 |
| 102 | 53.9 | 8.5 | 37.6 | 100 | 800 | 300 | 250 | 420 | 262 | 100–110 |
| 103 | 54.0 | 8.0 | 38.0 | 100 | 800 | 300 | 250 | 428 | 258 | 100–110 |
| 104 | 54.1 | 7.5 | 38.4 | 100 | 800 | 300 | 250 | 432 | 260 | 100–110 |
| 105 | 54.2 | 6.5 | 39.3 | 100 | 800 | 300 | 250 | 437 | 265 | 100–110 |
| 106 (comp.)* | 53.5 | 10.0 | 36.5 | 100 | 800 | 300 | 250 | 390 | 320 | 90–100 |
| 107 (comp.) | 53.7 | 10.0 | 36.3 | 100 | 800 | 300 | 250 | 400 | 320 | 100–110 |
| 108 (comp.) | 53.5 | 11.3 | 35.2 | 85 | 950 | 360 | 0 | 370 | 412 | 90–100 |
| 109 (comp.) | 53.4 | 12.0 | 34.6 | 100 | 800 | 300 | 250 | 384 | 332 | 100–110 |
| 110 (comp.) | 55.0 | 0.0 | 45.0 | 100 | 800 | 300 | 250 | 433 | 518 | 100–110 |
| 111 (comp.) | 54.0 | 8.0 | 38.0 | 50 | 800 | 300 | 250 | 421 | 367 | 100–110 |
| 112 (comp.) | 54.0 | 8.0 | 38.0 | 300 | 800 | 300 | 250 | 415 | 872 | 100–110 |
| 113 (comp.) | 54.0 | 8.0 | 38.0 | 100 | 200 | 300 | 250 | 403 | 414 | 100–110 |

*$SnO_2$ 2500 ppm added

TABLE 2

| Sample No. | Essential Components (mol %) | | | Side Components (ppm) | | | | Bs (120° C.) (mT) | Minimum Core Loss (kW/m³) | Temperature for Minimum Core Loss (° C.) |
|---|---|---|---|---|---|---|---|---|---|---|
| | $Fe_2O_3$ | ZnO | MnO | $SiO_2$ | $CaCO_3$ | $Nb_2O_5$ | $ZrO_2$ | | | |
| 114 (comp.) | 54.0 | 8.0 | 38.0 | 130 | 1430 | 300 | 250 | 434 | 363 | 100–110 |
| 115 (comp.) | 54.0 | 8.0 | 38.0 | 100 | 800 | 0 | 250 | 418 | 402 | 100–110 |
| 116 (comp.) | 54.0 | 8.0 | 38.0 | 100 | 800 | 700 | 250 | 418 | 819 | 100–110 |
| 117 (comp.) | 54.0 | 8.0 | 38.0 | 100 | 800 | 300 | 0 | 423 | 302 | 100–110 |
| 118 (comp.) | 54.0 | 8.0 | 38.0 | 100 | 800 | 300 | 600 | 418 | 648 | 90–110 |
| 119** | 53.8 | 8.0 | 38.2 | 100 | 800 | 300 | 250 | 415 | 260 | 100–110 |
| 120 | 54.0 | 8.0 | 38.0 | 100 | 800 | 200 | 250 | 434 | 250 | 100–110 |
| 121 | 54.0 | 8.0 | 38.0 | 100 | 800 | 300 | 150 | 433 | 258 | 100–110 |
| 122 | 54.0 | 8.0 | 38.0 | 130 | 650 | 300 | 250 | 437 | 256 | 100–110 |

**$SnO_2$ 3000 ppm added

From the data in Tables 1 and 2 and FIG. 1, it is known that the saturation magnetic flux density in the samples of the invention is high at high temperatures and that the core loss therein is extremely low at a temperature falling between 100 and 110° C.

Example 2

In the same manner as in Example 1, prepared were ferrite core samples (toroidal cores) for transformers, each having the composition shown in Table 3. Also in the same manner as in Example 1, Bs in those samples was measured.

The data obtained are in Table 3.

TABLE 3

| Sample | Essential Components (mol %) | | | Side Components (ppm) | | | | Bs (120° C.) |
|---|---|---|---|---|---|---|---|---|
| No. | Fe$_2$O$_3$ | ZnO | MnO | SiO$_2$ | CaCO$_3$ | Nb$_2$O$_5$ | ZrO$_2$ | (mT) |
| 201 | 54.2 | 6.0 | 39.8 | 100 | 800 | 300 | 250 | 428 |
| 202 | 54.4 | 5.0 | 40.6 | 100 | 800 | 300 | 250 | 438 |
| 203 | 54.5 | 4.5 | 41.0 | 100 | 800 | 300 | 250 | 438 |

In the samples of the invention, Bs linearly decreased with the increase in the ambient temperature of 100° C. to 110° C. to 120° C. From the data in Table 3, it is known that Bs in those samples is not lower than 410 mT within a temperature range of from 100 to 120° C. The core loss in those samples was low at temperatures of from 100 to 110° C.

Example 3

Figure 2:
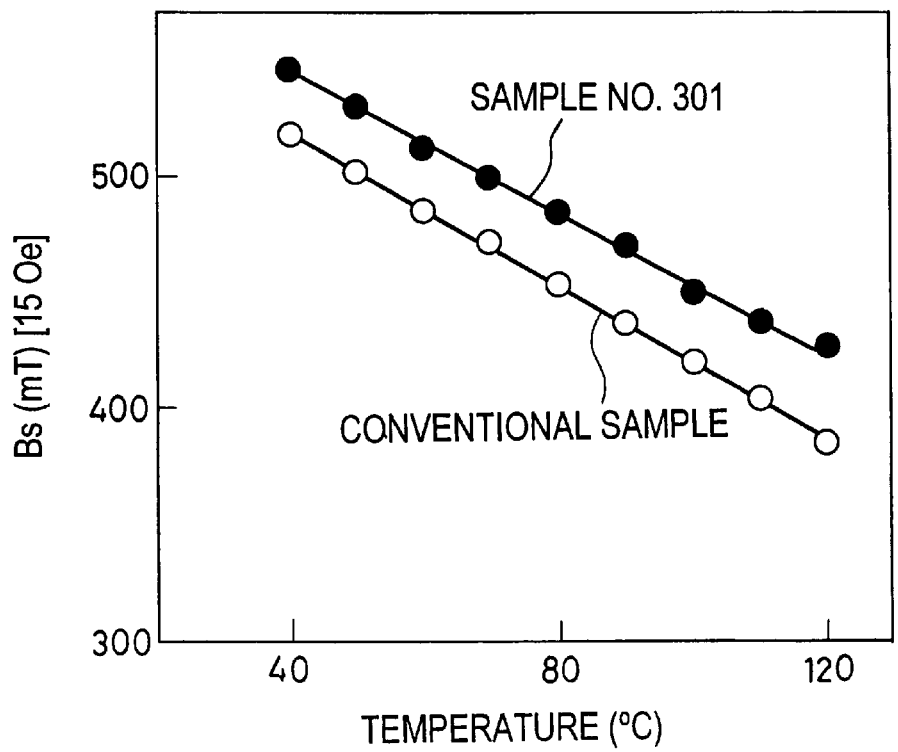
FIG. 2 is a graph showing the temperature-dependent variation in the saturation magnetic flux density in ferrite samples.

In the same manner as in Example 1, prepared were ferrite core samples (toroidal cores) for transformers, each having the composition shown in Tables 4 and 5. Also in the same manner as in Example 1, Bs in those samples was measured. In this, however, the samples were tested at an ambient temperature falling between 20 and 120° C. Tables 4 and 5 show the data of Bs and the temperature-dependent coefficient of Bs, dBs/dT (T=20 to 120° C.). FIG. 2 shows a graph of the temperature-dependent variation in Bs in Sample No. 301 (sample of the invention, this is the same as Sample No. 103 in Example 1) and in a conventional sample (Sample No. 309, this is the same as Sample No. 106 in Example 1).

TABLE 4

| Sample | Essential Components (mol %) | | | Side Components (ppm) | | | | Bs (120° C.) | dBs/dT |
|---|---|---|---|---|---|---|---|---|---|
| No. | Fe$_2$O$_3$ | ZnO | MnO | SiO$_2$ | CaCO$_3$ | Nb$_2$O$_5$ | ZrO$_2$ | (mT) | (T = 20 to 120° C.) |
| 301 | 54.0 | 8.0 | 38.0 | 100 | 800 | 300 | 250 | 428 | −1.55 |
| 302 | 54.1 | 7.5 | 38.4 | 100 | 800 | 300 | 250 | 432 | −1.52 |
| 303 | 54.2 | 6.5 | 39.3 | 100 | 800 | 300 | 250 | 437 | −1.29 |
| 304 | 54.2 | 6.0 | 39.8 | 100 | 800 | 300 | 250 | 428 | −1.27 |
| 305 | 54.4 | 5.0 | 40.6 | 100 | 800 | 300 | 250 | 438 | −1.18 |
| 306 | 54.5 | 4.5 | 41.0 | 100 | 800 | 300 | 250 | 438 | −1.17 |
| 307 | 54.7 | 3.0 | 42.3 | 100 | 800 | 300 | 250 | 438 | −1.06 |
| 308 | 55.0 | 2.0 | 43.0 | 100 | 800 | 300 | 250 | 437 | −0.94 |
| 309* (comp.) | 53.5 | 10.0 | 36.5 | 100 | 800 | 300 | 250 | 390 | −1.61 |
| 310 | 54.0 | 8.0 | 38.0 | 100 | 800 | 100 | 250 | 424 | −1.41 |
| 311 | 54.0 | 8.0 | 38.0 | 100 | 800 | 200 | 250 | 434 | −1.40 |

*SnO$_2$ 2500 ppm added

TABLE 5

| Sample | Essential Components (mol %) | | | Side Components (ppm) | | | | Bs (120° C.) | dBs/dT |
|---|---|---|---|---|---|---|---|---|---|
| No. | Fe$_2$O$_3$ | ZnO | MnO | SiO$_2$ | CaCO$_3$ | Nb$_2$O$_5$ | ZrO$_2$ | (mT) | (T = 20 to 120° C.) |
| 312 | 54.0 | 8.0 | 38.0 | 100 | 800 | 300 | 150 | 433 | −1.41 |
| 313 | 54.0 | 8.0 | 38.0 | 100 | 800 | 300 | 350 | 426 | −1.35 |
| 314 | 54.0 | 8.0 | 38.0 | 100 | 800 | 100 | 100 | 424 | −1.44 |
| 315 | 54.0 | 8.0 | 38.0 | 100 | 800 | 200 | 150 | 428 | −1.40 |
| 316 | 54.0 | 8.0 | 38.0 | 100 | 500 | 300 | 250 | 423 | −1.42 |
| 317 | 54.0 | 8.0 | 38.0 | 130 | 650 | 300 | 250 | 437 | −1.40 |
| 318 | 54.0 | 8.0 | 38.0 | 70 | 560 | 300 | 250 | 433 | −1.40 |
| 319 | 54.0 | 8.0 | 38.0 | 130 | 1040 | 300 | 250 | 434 | −1.39 |

From the data in Tables 4 and 5 and FIG. 2, it is known that the samples of the invention have a negative temperature-dependent coefficient of Bs, that the absolute value of the temperature-dependent coefficient is not larger than 1.6 mT/° C., and that Bs in the samples is high at temperatures of from 20 to 120° C. The core loss in those samples was small at temperatures of from 100 to 110° C.

Example 4

Essential components of $Fe_2O_3$, MnO and ZnO were weighed each in a predetermined amount as in Tables 6 and 7, wet-blended, and then calcined in air at 850° C. for 2 hours. Depending on the amounts of the essential components, predetermined amounts of side components of $SiO_2$, $CaCO_3$, $Nb_2O_5$ and $ZrO_2$ were added to the resulting mixture, and wet-milled to obtain a ferrite powder. 0.8% by weight, calculated as its solid content, of a binder of PVA was added to the powder, and granulated. The resulting grains were molded under a pressure of 1 ton/cm² into toroidal moldings (outer diameter: 24 mm, inner diameter: 12 mm, thickness: 5.5 mm). The moldings were fired in a mixed gas atmosphere of $N_2$—$O_2$ having a controlled oxygen partial pressure, at a firing temperature of 1300° C. for 5 hours. Thus were obtained toroidal cores having an outer diameter of 20 mm, an inner diameter of 10 mm and a thickness of 5 mm. Using $Ta_2O_5$ in place of $Nb_2O_5$, a different core sample was produced in the same manner as herein. Through its fluorescent X-ray spectrometry, each final ferrite composition was verified to correspond to the composition of the starting components.

Each core sample obtained herein was tested in an alternating current B-H analyzer (IWATSU-SY8232) for the core loss therein at an exciting magnetic flux density of 200 mT and at a frequency of 100 kHz. In addition, it was tested in a direct current B-H analyzer (YEW4192) for the saturation magnetic flux density Bs therein in a magnetic field of 15 Oe and at a temperature of 60° C.

Tables 6 and 7 show the data of Bs and the minimum core loss in each sample, and the temperature at which the core loss was minimized.

TABLE 6

| Sample | Essential Components (mol %) | | | Side Components (ppm) | | | | Bs (60° C.) | Minimum Core | Temperature for Minimum Core |
|---|---|---|---|---|---|---|---|---|---|---|
| No. | $Fe_2O_3$ | ZnO | MnO | $SiO_2$ | $CaCO_3$ | $Nb_2O_5$ | $ZrO_2$ | (mT) | Loss (kW/m³) | Loss (° C.) |
| 401 | 54.6 | 9.0 | 36.4 | 100 | 800 | 300 | 250 | 515 | 234 | 60 |
| 402 | 54.8 | 8.0 | 37.2 | 100 | 800 | 300 | 250 | 520 | 240 | 60 |
| 403 | 54.9 | 7.0 | 38.1 | 100 | 800 | 300 | 250 | 518 | 247 | 60 |
| 404 | 54.8 | 9.0 | 36.2 | 100 | 800 | 300 | 250 | 507 | 246 | 50 |
| 405 | 55.0 | 8.0 | 37.0 | 100 | 800 | 300 | 250 | 522 | 242 | 50 |
| 406 | 55.1 | 7.0 | 37.9 | 100 | 800 | 300 | 250 | 524 | 256 | 50 |
| 407 | 54.4 | 10.0 | 35.6 | 100 | 800 | 300 | 250 | 493 | 250 | 60 |
| 408 | 54.4 | 11.0 | 34.6 | 100 | 800 | 300 | 250 | 486 | 240 | 50 |
| 409 (comp.) | 55.2 | 5.0 | 39.8 | 100 | 800 | 300 | 250 | 499 | 291 | 60 |
| 410 (comp.) | 54.0 | 12.0 | 34.0 | 100 | 800 | 300 | 250 | 460 | 253 | 60 |
| 411 (comp.) | 56.2 | 8.0 | 35.8 | 100 | 800 | 300 | 250 | 524 | 764 (255)* | 10 |

*The core 1055 at 60° C. and that at the temperature for minimum core loss are shown. The latter is parenthesized.

TABLE 7

| Sample | Essential Components (mol %) | | | Side Components (ppm) | | | | Bs (60° C.) | Minimum Core | Temperature for Minimum Core |
|---|---|---|---|---|---|---|---|---|---|---|
| No. | $Fe_2O_3$ | ZnO | MnO | $SiO_2$ | $CaCO_3$ | $Nb_2O_5$ | $ZrO_2$ | (mT) | Loss (kW/m³) | Loss (° C.) |
| 412 (comp.) | 54.8 | 8.0 | 37.2 | 50 | 800 | 300 | 250 | 521 | 341 | 60 |
| 413 (comp.) | 54.8 | 8.0 | 37.2 | 300 | 800 | 300 | 250 | 514 | 811 | 60 |
| 414 (comp.) | 54.8 | 8.0 | 37.2 | 100 | 200 | 300 | 250 | 513 | 385 | 60 |
| 415 (comp.) | 54.8 | 8.0 | 37.2 | 130 | 1430 | 300 | 250 | 537 | 338 | 60 |
| 416 (comp.) | 54.8 | 8.0 | 37.2 | 100 | 800 | 0 | 250 | 518 | 374 | 60 |
| 417 (comp.) | 54.8 | 8.0 | 37.2 | 100 | 800 | 700 | 250 | 518 | 762 | 60 |
| 418 (comp.) | 54.8 | 8.0 | 37.2 | 100 | 800 | 300 | 0 | 524 | 290 | 60 |
| 419 (comp.) | 54.8 | 8.0 | 37.2 | 100 | 800 | 300 | 600 | 518 | 603 | 60 |
| 420 (comp.) | 54.8 | 8.0 | 37.2 | 100 | 800 | —** ($Ta_2O_5$ 300 ppm) | 250 | 518 | 285 | 60 |

**$Nb_2O^5$ was not added, but 300 ppm of $Ta_2O_5$ was added.

From the data in Tables 6 and 7, it is known that Bs in the samples of the invention is high within a temperature range (50 to 700° C.) within which transformers may be driven and that the core loss therein is low within the driving temperature range.

As opposed to those, the core loss in the sample having a ZnO content of smaller than 6 mol % is high (Sample No. 409), and Bs in the sample having a ZnO content of larger than 11 mol % is low (Sample No. 410). In the sample having an $Fe_2O_3$ content of larger than 56 mol %, the minimum core loss appears at a low temperature, and the core loss at temperatures around the driving temperature range is high (Sample No. 411). In the samples in which the amounts of the side components all overstep the ranges defined herein, the core loss at temperatures around the driving temperature range is high (Samples Nos. 413 to 419). In the sample containing $Ta_2O_5$ in place of $Nb_2O_5$, the core loss is high (Sample No. 420). In ferrite cores having an $Fe_2O_3$ content of smaller than 54 mol %, the minimum core loss appears within a temperature range of from 100 to 110° C., like in Sample No. 101 (Table 1) in Example 1; and the core loss in those cores within the driving temperature range is high (for example, 431 $kW/m^3$ at 60° C.). Therefore, the ferrite cores having such a small $Fe_2O_3$ content are not suitable to use in transformers to be driven within the temperature range of from 50 to 70° C.

Example 5

To the composition of Sample 402 in Example 4 (Table 6), cobalt oxide was added in an amount of 2000 ppm calculated as $Co_3O_4$ to prepare Sample No. 402A. In this, cobalt oxide was mixed with the essential components, $Fe_2O_3$, MnO and ZnO prior to being calcined.

The sample was evaluated for its characteristics in the same manner as in Example 4. The data obtained are shown in Table 8.

TABLE 8

| Sample No. | Bs (60° C.) (mT) | Minimum Core Loss (kW/m³) | Temperature of Minimum Core Loss (° C.) |
|---|---|---|---|
| 2A (cobalt oxide added) | 520 | 260 | 60 |

The data in Table 8 verify the practical level of this sample.

Example 6

Using the ferrite core of Sample No. 401 in Example 4 of the invention, produced was a transformer A.

Briefly, the ferrite core was PQ-shaped, and its size was 59 mm×42 mm×27 mm (metatarsal diameter: 24 mm). For the coiling count for the core, the primary coil was in one turn, and the secondary coil was in 4 turns.

The transformer A was found to be well driven at a temperature of 60° C., at a frequency of 100 kHz and in an exciting magnetic flux density of 200 mT.

According to the present invention, obtained are ferrites in which the core loss is low and Bs is high at high temperatures. Also obtained are transformers capable of being small-sized and suitable to use at high temperatures. The transformers can be efficiently driven even at high temperatures. In addition, the transformers are suitable to use in a broad temperature range including high temperatures, and can be small-sized.

Also according to the invention, obtained are high-efficiency transformers capable of being small-sized, in which the core loss in the ferrite core is low and the saturation magnetic flux density is high therein at the temperature at which the transformers are driven. The transformers of the invention can be efficiently driven according to the driving method for them of the invention.

While the invention has been described in detail and with reference to specific embodiments thereof, it will be apparent to one skilled in the art that various changes and modifications can be made therein without departing from the spirit and scope thereof.

What is claimed is:

1. A ferrite consisting essentially of iron oxide in an amount of from 53 to 55 mol % calculated as $Fe_2O_3$, zinc oxide in an amount of from 6.5 to 9.5 mol % calculated as ZnO, and manganese oxide, and containing, as side components, silicon oxide in an amount of from 80 to 150 ppm calculated as $SiO_2$, calcium oxide in an amount of from 600 to 1000 ppm calculated as $CaCO_3$, niobium oxide in an amount of from 150 to 400 ppm calculated as $Nb_2O_5$, and zirconium oxide in an amount of from 40 to 300 ppm calculated as $ZrO_2$.

2. A transformer of which the core is made of a ferrite that consists essentially of iron oxide in an amount of from 53 to 55 mol % calculated as $Fe_2O_3$, zinc oxide in an amount of from 4.0 to 9.5 mol % calculated as ZnO, and manganese oxide, and contains, as side components, silicon oxide in an amount of from 60 to 200 ppm calculated as $SiO_2$, calcium oxide in an amount of from 300 to 1200 ppm calculated as $CaCO_3$, niobium oxide in an amount of from 50 to 500 ppm calculated as $Nb_2O_5$, and zirconium oxide in an amount of from 10 to 450 ppm calculated as $ZrO_2$, and in which the saturation magnetic flux density (direct current) in said ferrite at a temperature falling between 100 and 120° C. is not smaller than 410 mT.

3. The transformer as claimed in claim 2, wherein the minimum core loss in said ferrite is within a temperature range falling between 100 and 110° C. and the minimum core loss (at a frequency of 100 kHz) is not larger than 300 $kW/m^3$.

4. The transformer as claimed in claim 2 or 3, wherein said ferrite consists essentially of iron oxide in an amount of from 53 to 55 mol % calculated as $Fe_2O_3$, zinc oxide in an amount of from 6.5 to 9.5 mol % calculated as ZnO, and manganese oxide, and contains, as side components, silicon oxide in an amount of from 80 to 150 ppm calculated as $SiO_2$, calcium oxide in an amount of from 600 to 1000 ppm calculated as $CaCO_3$, niobium oxide in an amount of from 150 to 400 ppm calculated as $Nb_2O_5$, and zirconium oxide in an amount of from 40 to 300 ppm calculated as $ZrO_2$.

5. A transformer of which the core is made of a ferrite that consists essentially of iron oxide in an amount of from 53 to 55 mol % calculated as $Fe_2O_3$, zinc oxide in an amount of from 2.0 to 8.0 mol % calculated as ZnO, and manganese oxide, and contains, as side components, silicon oxide in an amount of from 60 to 200 ppm calculated as $SiO_2$, calcium oxide in an amount of from 300 to 1200 ppm calculated as $CaCO_3$, niobium oxide in an amount of from 50 to 500 ppm calculated as $Nb_2O_5$, and zirconium oxide in an amount of from 10 to 450 ppm calculated as $ZrO_2$, and in which the absolute value of the temperature-dependent coefficient of the saturation magnetic flux density (direct current) in said ferrite at a temperature falling between 20 and 120° C. is not larger than 1.6 mT/° C.

6. A method for driving a transformer of which the core is made of a ferrite that consists essentially of iron oxide in an amount of from 53 to 55 mol % calculated as $Fe_2O_3$, zinc oxide in an amount of from 4.0 to 9.5 mol % calculated as ZnO, and manganese oxide, and contains, as side components, silicon oxide in an amount of from 60 to 200 ppm calculated as $SiO_2$, calcium oxide in an amount of from 300 to 1200 ppm calculated as $CaCO_3$, niobium oxide in an amount of from 50 to 500 ppm calculated as $Nb_2O_5$, and zirconium oxide in an amount of from 10 to 450 ppm calculated as $ZrO_2$, wherein said transformer is driven at a temperature falling between 60 and 120° C., at a frequency falling between 20 and 500 kHz and in an exciting magnetic flux density falling between 200 and 500 mT.

7. The method for driving a transformer as claimed in claim 6, wherein said ferrite for the core of the transformer consists essentially of iron oxide in an amount of from 53 to 55 mol % calculated as $Fe_2O_3$, zinc oxide in an amount of from 6.5 to 9.5 mol % calculated as ZnO, and manganese oxide, and contains, as side components, silicon oxide in an amount of from 80 to 150 ppm calculated as $SiO_2$, calcium oxide in an amount of from 600 to 1000 ppm calculated as $CaCO_3$, niobium oxide in an amount of from 150 to 400 ppm calculated as $Nb_2O_5$, and zirconium oxide in an amount of from 40 to 300 ppm calculated as $ZrO_2$.

8. A transformer of which the core is made of a ferrite that consists essentially of iron oxide in an amount of from 54 to 56 mol % calculated as $Fe_2O_3$, zinc oxide in an amount of from 6 to 11 mol % calculated as ZnO, and manganese oxide, and contains, as side components, silicon oxide in an amount of from 80 to 150 ppm calculated as $SiO_2$, calcium oxide in an amount of from 600 to 1000 ppm calculated as $CaCO_3$, niobium oxide in an amount of from 150 to 400 ppm calculated as $Nb_2O_5$, and zirconium oxide in an amount of from 40 to 300 ppm calculated as $ZrO_2$, and in which the saturation magnetic flux density (direct current) in the ferrite at 60° C. is not smaller than 480 mT, the minimum core loss in the ferrite is within a temperature range falling between 50 and 70° C. and the minimum core loss (at a frequency of 100 kHz) is not larger than 260 $kW/m^3$.

9. The transformer as claimed in claim 8, wherein the zinc oxide content of the ferrite falls between 6 and 9.5 mol % calculated as ZnO.

10. The transformer as claimed in claim 8 or 9, wherein the saturation magnetic flux density (direct current) in the ferrite at 60° C. is not smaller than 500 mT.

11. A method for driving a transformer of any one of claims 8 to 10 at a temperature falling between 50 and 70° C., at a frequency falling between 20 and 500 kHz and in an exciting magnetic flux density falling between 125 and 500 mT.

\* \* \* \* \*